May 19, 1942. G. G. BARR 2,283,783
AUTOMOBILE BODY TRIMMING DEVICE
Filed Nov. 3, 1937 2 Sheets-Sheet 1
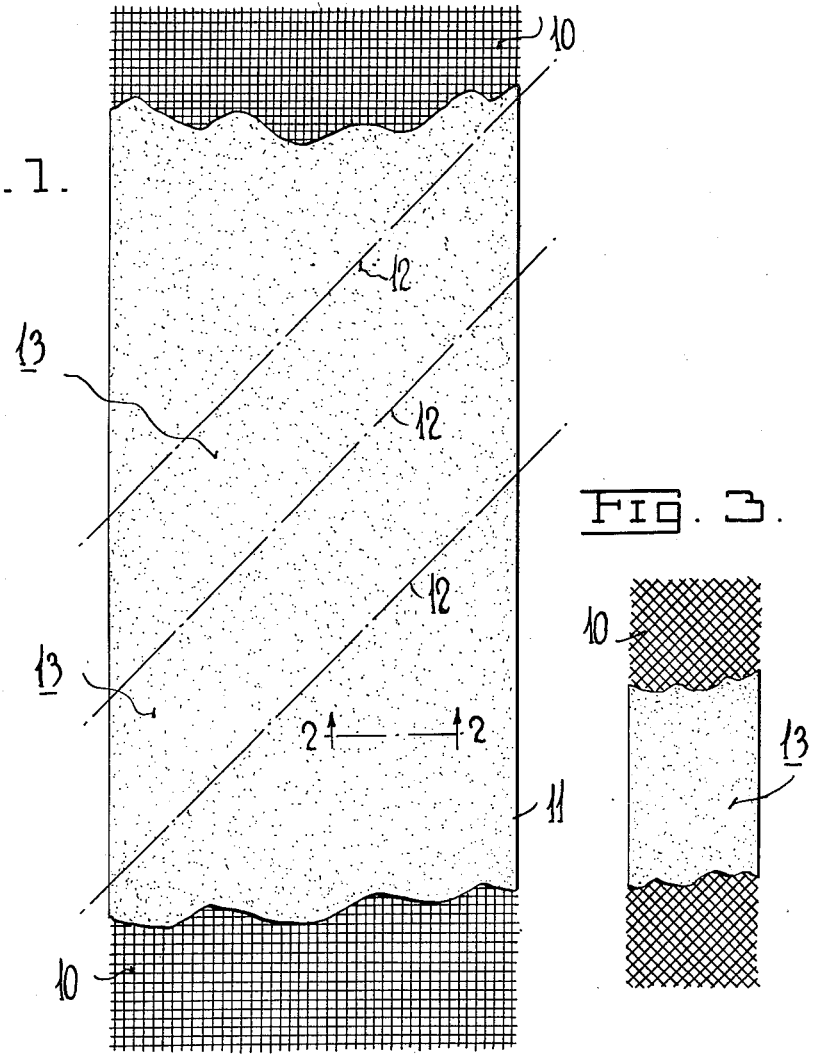
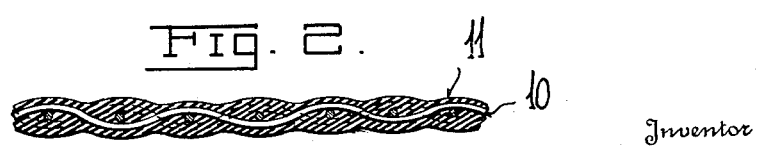

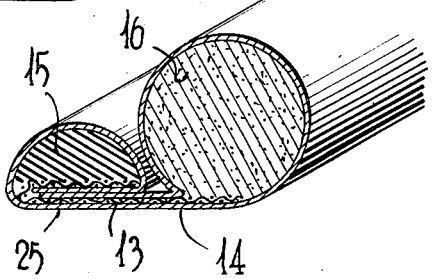
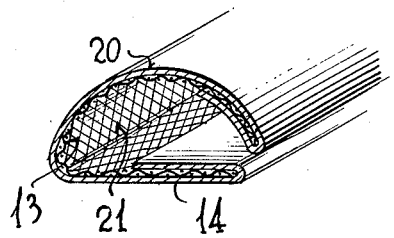
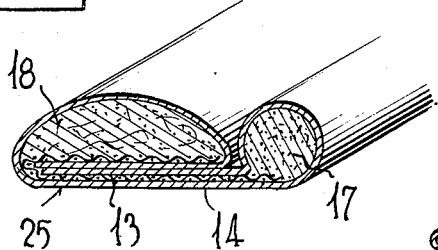
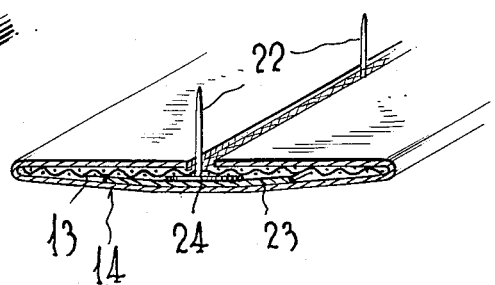
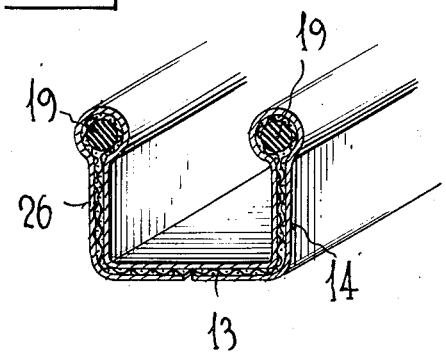
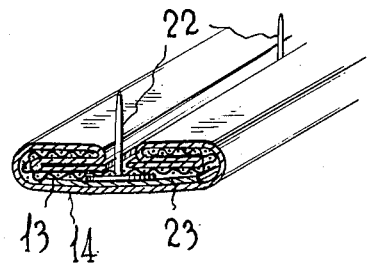

Patented May 19, 1942

2,283,783

UNITED STATES PATENT OFFICE 2,283,783

AUTOMOBILE BODY TRIMMING DEVICE

Glen G. Barr, Union City, Ind., assignor to Backstay Welt Company, Union City, Ind., a corporation of Indiana Application November 3, 1937, Serial No. 172,599

2 Claims. (Cl. 20—74)

My invention relates to trimming devices, particularly those used in automobile body constructions, for trimming seat and body fabrics generally and door and window openings. These devices include the elements known as finishing welts, gimps and bindings, windlaces and glass run channels.

The welts, gimps and bindings are used to trim the meeting edges of fabrics and the margins of a fabric sheet and a metal body part in automobile interiors and exteriors. Windlaces are elongated strips secured to the door opening of an automobile body and commonly have an enlarged soft bead projecting slightly into the opening and adapted to have a weatherstrip or gasket function to seal the closed door against ingress of water, air and dust. The glass run channels are elongated bodies of substantially U-shape cross section disposed in door and window frames for receiving and cushioning the sliding movements of the conventional sashless pane of glass.

In all of these devices it is necessary at times to incorporate bends or curves in the plane of a flat length of the body. Thus, the glass run channel used for each window is preferably a single, continuous length which takes a generally U-shape, beginning at the bottom of one vertical run of the channel and extending to the bottom of the other vertical run. The channel sides lie in the plane of the curved portions where the vertical runs merge into the upper, horizontal run which receives the top margin of the glass when the window is closed. Similarly, the windlace extends in generally U-shape around the two sides and top of a door opening, and the flat base of the windlace lies in the plane of the curved portions where the vertical runs of the windlace merge with the connecting top, horizontal portion. Again, in trimming seat and body fabrics the welt, gimp or binding must at times be disposed about similar curves, as is well known.

These devices are best made from strips of fabric or the like folded on themselves with or without cores or fillers of various cross sectional shapes suitable to particular style or functional requirements. In the interest of durability and permanence the several plies of the bodies are sewed together or adhesively bonded, and this union militates against ease of curving or bending in a plane of the flat portion of the body.

The difficulty introduced by the permanent union of the several plies of the body is aggravated when one of these plies is a wire-bearing sheet or strip. Such wire-bearing strips are desirable to give the body form-maintaining properties, particularly in the case of trimming elements of the blind nail type, which include a flat base portion, adapted to be tacked to a supporting structure, and an integral flap portion adapted to be disposed down into substantial contact with the base to conceal the tack heads. In such devices it has been customary to employ an internal ply containing wire which extends into the flap and base portions and across the longitudinal line along which the body is folded to provide such portions. Devices of this type are disclosed in Schemmel Patents Nos. 1,719,729, 1,743,624 and 1,900,768.

Moderate success has attended the use of the wire-containing ply because of the capacity of such ply to hold the flap down on the base in final position, but the construction has been unsatisfactory because the wire-containing ply adds materially to the buckling of the body and predisposes the body to kinking and puckering when turns of relatively short radius must be negotiated.

The Schemmel Patents Nos. 1,528,699, 1,904,543, 1,924,382 and 2,017,377 show constructions in which bulkiness caused by use of the wire-containing ply is minimized by incorporating the wire in the covering ply, i. e., by combining in one ply the functions of the covering material and the wire-containing strip. This expedient has not entirely removed the disadvantage because it is extremely difficult to conceal the wires in the covering fabric and because the construction remains almost impossible to bend about short turns without kinking and puckering.

These prior art devices include transverse wire filaments woven with longitudinal fibrous threads. Such constructions are expensive to make. A better medium for the wire is ordinary wire mesh like the familiar window screen material, but its use has heretofore been unsuccessful because of its tendency to ravel when cut into narrow strips and because it is impractical to glue sheets of textile fabric to its opposite surfaces, the increase in bulk being objectionable and the stiffening of the composite fabric and its resistance to transverse bending being very great.

My invention contemplates an improvement in the formation of these devices. It contemplates the use of an internal ply of woven, pliable wire filaments, such as wire mesh window screen material, faced with a thin film of some solidified, yieldable, plastic material, like rubber or a deposition from a latex solution, which holds the component wire filaments in place while permitting a limited degree of relative readjustment of the filaments when the body is curved or bent. The wire-containing strip may be and preferably is made very thin. It need be but slightly thicker than the wire mesh material. The substantially solidified plastic is securely bonded to the covering fabric of the finished device, and securely supports the covering fabric and elongates and contracts with it when the body is curved or bent. The connection between the wires and the material in which they are embedded is such that the wires may to a limited degree move in the material and easily rearrange themselves when the body is curved or bent. Such rearrangement takes place without objectionable kinking or puckering in the case of curves of the shortest radius encountered in any usual installation.

Other advantages are inherent in the various embodiments of the invention, some of which embodiments are illustrated in the accompanying drawings, in which:

Figure 1 is a plan view of a sheet of wire-containing material showing certain stages in the production of the internal, wire-containing ply of the present invention;

Figure 2 is a cross section taken on the line 2—2 of Figure 1;

Figure 3 is a plan view of a preferred type of wire-containing ply;

Figure 4 is a perspective view, with one end in section, of a windlace embodying the invention;

Figure 5 is a perspective view, with one end in section, of a finishing welt embodying the invention;

Figure 6 is a perspective view, with one end in section, of a glass run channel embodying the invention;

Figure 7 is a perspective view, with one end in section, of a modified type of finishing welt embodying the invention; and Figures 8 and 9 are perspective views, each with one end in section, showing respectively a partially completed and a completed binding strip having nails or nail shanks permanently embedded therein.

Fig. 1 shows a preferred manner of producing the wire-containing ply. A wide sheet 10 of woven wire filaments, in the form of the familiar window screen material or the like, and about of that gauge, is dipped into a vessel containing a plastic substance capable of adhering in the form of a thin film to both sides of the wire sheet and filling or substantially filling the interstices between the wires and of thereafter becoming relatively solid but sufficiently yieldable to permit the sheet to be flexed easily and the wires to undergo a limited degree of readjustment on such flexing. The coating substance is preferably a latex solution, but I may use rubber in any other form, or some of the asphaltic base materials or pyroxylin now extensively used in impregnating fabrics. Any material will be satisfactory which has the properties of adhering to the wires and thereby maintaining their relative positions while permitting a limited degree of readjustment of those positions when the wires are bent or curved, particularly when the bend is in the plane of the sheet.

In Fig. 1 the coating is designated by the reference numeral 11. The coating is allowed to dry or harden, whereupon a cross section of the fabric will appear somewhat as shown in Fig. 2, where the thickness of the coating which I prefer to use is slightly exaggerated for the sake of clarity.

The sheet of Fig. 1 is slit into strips of the required width. The slitting may be longitudinal, parallel with the sides of the sheet, but I prefer to cut the sheet diagonally, as along the lines 12, to produce what are in effect bias woven strips 13, which may be spliced end to end or merely laid end to end to form the internal ply of a device embodying my invention.

The strip 13 is incorporated in a welt, gimp, binding, windlace, glass run channel or the like in any usual manner. Preferably the strip is adhesively secured or sewed to the back of a ply of fibrous thread fabric 14 as shown in Figs. 4–9. The coating borne by the strip 13 bonds excellently with the ply 14, the union being tenacious and permanent. The strips 13 and 14 are associated in widths desirable for the intended body, and the two plies are folded on themselves, and, if desired, around suitable fillers, to make the intended product.

Fig. 4 shows a windlace in which the bonded plies 13 and 14 are associated with a relatively small and hard core 15 and a relatively soft and large core 16, the latter forming the sealing element of the windlace and the former forming the tack-concealing flap.

Fig. 5 shows a familiar type of finishing welt formed by disposing the bonded plies 13 and 14 in suitable relation to a round filler 17 marking the edge of the base of the welt and a substantially half-round core 18 filling the flap of the welt.

Fig. 6 illustrates a glass run channel in which the associated plies 13 and 14 are folded around edge bead fillers 19, and the whole body is formed into channel shape, as shown.

Fig. 7 shows a novel type of finishing welt, made possible by the new internal ply construction, in which the tack-concealing flap 20 is devoid of filling, being simply arched to provide a convex upper surface, a hollow space 21 being left between the flap and base portions. Prior art wire cloth plies have not been sufficiently self-sustaining to be arched to form the contour, but have in all cases required backing by a filler core to prevent collapse and distortion of the contour in curved or bent portions of the welt. The ability of the new wire-containing ply to adapt itself to bends without collapse or kinking makes possible the elimination of the core or filler, so that the welt shown in Fig. 7 is, so far as I am aware, the first successful coreless welt.

Fig. 8 shows an intermediate step in a method of making a tack-bearing binding strip. Tacks 22 are laid on a backing strip 23 at spaced intervals. The tack heads 24 may or may not be connected. To opposite sides of the strip 23 there are then applied an internal wire ply 13 and an external fibrous thread fabric strip 14, folded as shown in Fig. 8 to embrace the tacks. The margins of the relatively wide strip are then folded over toward the tack shanks to form the finished body shown in Fig. 9. The wire ply maintains the tacks securely in the structure.

In each of these devices the wire ply is firmly secured to the adjacent fibrous thread fabric, as by use of an adhesive. The coating film of the wire ply adheres to the outer ply and backs and reinforces it against tendency to kink at curves. This ability is probably inherent in the rubber or other plastic of which the coating is made, since such materials are yieldable and when subjected to tensile and compressive stresses they distribute uniformly throughout their mass new zones of increased or decreased density, or they become thicker or thinner uniformly over a considerable area so that no appreciable change in thickness occurs at any particular point. Wtihin the coating the wire filaments are movable slightly so as to become readily accommodated to their new positions relative to the coating and to the fibrous thread fabric. Hence, each of the bodies illustrated in Figs. 4–9 can be curved or bent in the plane of one of its flat portions, such as the bases 25 of the windlace or finishing welt and the side walls 26 of the glass run channel, without appreciable distortion of such portions.

The same relative movement of wire on the one hand and film and fibrous thread fabric on the other hand takes place when the arched flap 20 of the new type of finishing welt shown in Fig. 7 is disposed about a transverse curve. This adjustment of parts minimizes the tendency of the arched flap to collapse, as has been explained, so that the coreless welt is entirely practical and satisfactory, particularly where the welt does not have to withstand impacts which would flatten it out.

In each embodiment of the invention the wire filaments may be arranged to run respectively at right angles and parallel to the length of the strip, or they may all be arranged to extend obliquely to such length. I prefer the oblique arrangement because it facilitates the readjustment of filaments incident to bending. One way to obtain a wire strip with the filaments running obliquely to the edges of the strip is shown in Fig. 1, disclosing the steps of coating and diagonally cutting a square woven sheet of wire screen material. Another way to obtain the strip shown in Fig. 3 is to coat a sheet of diamond weave wire mesh, in which the filaments extend at substantially right angles to each other and obliquely to the edges of the sheet. A relatively wide sheet of such wire may be coated and then slitted parallel to its longitudinal edges to provide strips of the desired width. Such strips will of course contain wire filaments running obliquely to its longitudinal edges, as shown in Fig. 3.

While the illustrated embodiments show a mesh in which the interstices are substantially square, it is within the broad scope of the invention to employ, for some purposes if desired, wire mesh material in which the interstices are oblong.

It is to be understood of course that the devices illustrated by Figs. 4–9 are suggestive and representative of the types of construction in which the invention may be incorporated, and these devices have been selected to exemplify the invention and not to limit it. The invention is applicable in general to all sorts of composite bodies in which it is desirable to include transverse stiffening wires and which the exigencies of some installations may require to be disposed about transverse curves. All such embodiments of the invention, to the extent that they incorporate the principles thereof as pointed out by the appended claims, are to be deemed within the scope and purview thereof.

I claim:

1. As an article of manufacture, a narrow, elongated, thin composite strip adapted to be used as a reinforcing and form-maintaining ply of a finishing strip or the like, said composite strip comprising a base formed from a multiplicity of pliable, non-resilient wire filaments woven together and a relatively thin single film of rubber deposited from latex covering the surfaces of the filaments and filling the interstices between them, whereby said material substantially maintains the filaments in their original relative positions while permitting, on bending the composite strip flatwise laterally, relative rearrangement of the filaments without materially increasing the thickness of the composite strip at the zone of bending, said film being thin enough to render the composite strip not appreciably thicker than the woven wire base.

2. As an article of manufacture, a narrow, elongated, thin composite strip adapted to be used as a reinforcing and form-maintaining ply of a finishing strip or the like, said composite strip comprising a base formed from a multiplicity of pliable, non-resilient wire filaments woven together and a relatively thin single film of rubber bearing material covering the surfaces of the filaments and filling the interstices between them, whereby said material substantially maintains the filaments in their original relative positions while permitting, on bending the composite strip flatwire laterally, relative rearrangement of the filaments without materially increasing the thickness of the composite strip at the zone of bending, said film being thin enough to render the composite strip not appreciably thicker than the woven wire base.

GLEN G. BARR.